S. A. WEST.
STEAM-ENGINE GOVERNOR.

No. 189,289. Patented April 3, 1877.

Scale of ½ Size.

Witnesses.
J. W. Brown.
John Barton.

Inventor:
Samuel A. West
Per G. L. Pierce,
Atty.

UNITED STATES PATENT OFFICE.

SAMUEL A. WEST, OF SAN FRANCISCO, CALIFORNIA, ASSIGNOR OF ONE-HALF HIS RIGHT TO PHILIP HINKLE, OF SAME PLACE.

IMPROVEMENT IN STEAM-ENGINE GOVERNORS.

Specification forming part of Letters Patent No. 189,289, dated April 3, 1877; application filed May 1, 1876.

*To all whom it may concern:*

Be it known that I, SAMUEL A. WEST, of the city and county of San Francisco, and State of California, have invented an Improvement in Steam-Engine Governors, of which the following is a specification:.

Figure 1:
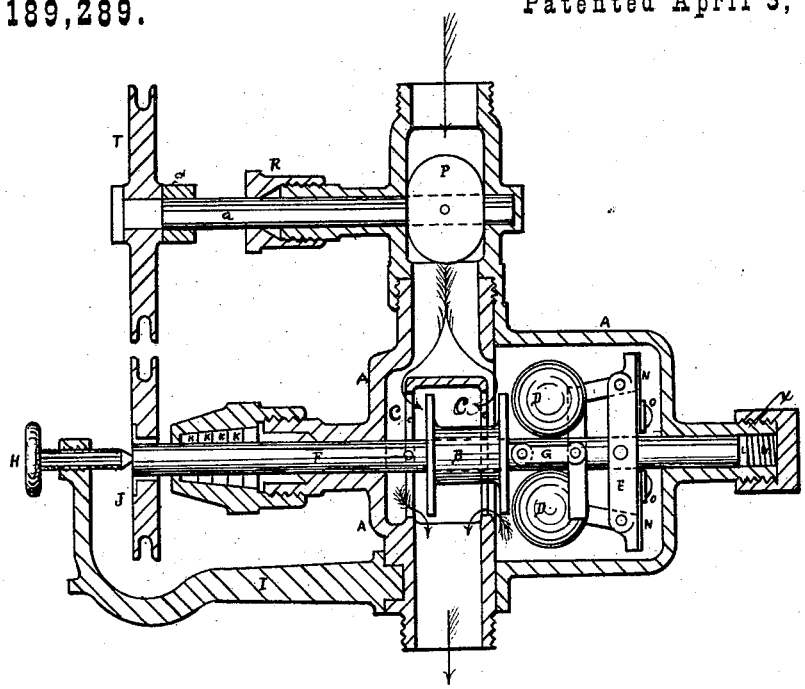
Figure 2:
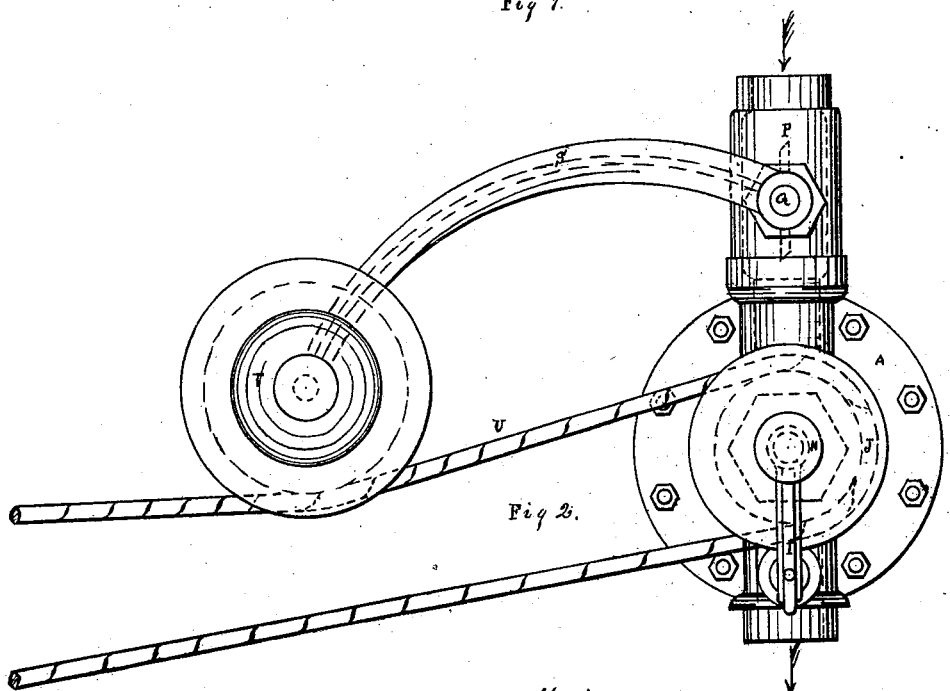

Figure 1 is a longitudinal section; and Fig. 2 is an elevation, showing the stop-motion.

The object of my invention is to produce a steam-engine governor applicable to all classes of steam-engines, stationary, marine, portable, rotary, or any class of steam-engines where governors are, can, or may be used to maintain a uniform speed, and, at the same time, to change or alter the speed of said engines without changing any of the parts of the engine, governor, or belt, and, at the same time, obviate the possibility of the engine racing, thereby preventing the breakage of the propeller, or, in stationary engines, of bursting fly-wheels.

I am well aware that many attempts in this direction have been made, and with considerable success; but their profused complications have rendered them not only expensive, but more or less uncertain in their action.

My main aim has been to make it as simple as is compatible with durability and reliability of action. I have also sought to protect the machine itself from accident, by inclosing it in a steam-tight metallic casing, which can be removed in a moment's time, exposing all the mechanism, and giving perfect access to each and every part when repairs are necessary.

This case is designed for a double purpose—first, protection to the working parts of the governor, and, second, to allow it to work in live steam, so that it may be perfectly balanced in every and all positions that it may assume, avoiding all possible and unnecessary friction.

In Fig. 1 in the drawing, A is the steam-tight casing. B is the balanced valve, movable on the shaft F. C C are the orifices through which the steam passes on its way to the cylinder, as shown by the arrows. D D are the balls. E is a cross-head, attached to the shaft F, to which the arms of the balls are jointed. G is a link connecting the valve to the balls, there being one on the opposite side. (Not shown.) H is the speeder, used to control and regulate the speed of the engine at will. I is an arm to hold the speeder. J is a pulley, fast on the shaft F, by which the governor is rotated. K K K K are split metallic rings in a conical stuffing-box. L is a steel button, upon which the point of the shaft F turns, placed on the end of the spiral spring M. N N are springs acting upon the arms on top of the governor, held by the clamps O O. P is the stop-valve, fast on the shaft or spindle a, passing out through the stuffing-box R. On the end of said shaft or spindle is attached the arm S, holding the pulley T, which rests on the belt U.

The action is as follows: The shaft F being put in rapid motion by the belt U, the balls D D will be thrown outward by centrifugal force, causing the valve B to slide on the shaft F toward the orifices in the casing C C, thereby diminishing the flow of steam.

Should the engine not have the required speed the valve B can be forced open or closed by the speeder H, the spiral spring M allowing the shaft F to move endwise. When the proper speed is obtained, and the throttle-valve wide open, the slightest change, either in the pressure of the steam or amount of load, will adjust the valve accordingly. The springs N N, acting against the centrifugal force, open the valve as soon as that force is in the slightest degree diminished.

It is evident that as the steam is on all sides of the valve at the same time it is perfectly balanced, and therefore requires no other force to move it than sufficient to overcome the friction, which will be, compaatively speaking, nothing.

Should the belt U break or run off, the wheel T, with the arm S, will drop and close the valve P, and thereby stopping all communication with the boiler, the engine necessarily comes to a dead-stop.

What I claim as my invention is—

1. The rotating rod F, provided with the cross-head E, containing springs N, in combination with the link G, balls D D, loose sliding valve B, and casing C, as set forth.

2. In a steam-engine governor, the bolt U, wheel T, arm S, and rod a, in combination with the rotating cut-off valve P, governor-valve B, as and for the purpose described.

SAMUEL A. WEST.

Witnesses:
J. W. BROWN,
JOHN BURTON.